Jan. 23, 1968    D. B. FOSTER    3,365,699
APPARATUS FOR THE AUTOMATIC DIMENSIONAL
INSPECTION OF AN OBJECT
Original Filed July 19, 1963    4 Sheets-Sheet 1

Inventor
DAVID BLYTHE FOSTER
By Holcombe, Wetherill & Brisebois
Attorneys

Jan. 23, 1968     D. B. FOSTER     3,365,699
APPARATUS FOR THE AUTOMATIC DIMENSIONAL
INSPECTION OF AN OBJECT
Original Filed July 19, 1963     4 Sheets-Sheet 3

*Inventor*
DAVID BLYTHE FOSTER
By
Holcombe, Wetherill & Brisebois
*Attorneys*

Jan. 23, 1968 D. B. FOSTER 3,365,699
APPARATUS FOR THE AUTOMATIC DIMENSIONAL
INSPECTION OF AN OBJECT
Original Filed July 19, 1963 4 Sheets-Sheet 4

Inventor
DAVID BLYTHE FOSTER
By
Holcombe, Wetherill & Brisebois
Attorneys

# United States Patent Office 3,365,699
Patented Jan. 23, 1968

3,365,699
**APPARATUS FOR THE AUTOMATIC DIMEN-
SIONAL INSPECTION OF AN OBJECT**
David Blythe Foster, Windlesham, Surrey, England, assignor to North Atlantic Research Products Limited, London, England, a British company
Continuation of application Ser. No. 296,314, July 19, 1963. This application Oct. 12, 1966, Ser. No. 586,308
Claims priority, application Great Britain, July 20, 1962, 27,919/62; Aug. 20, 1962, 31,819/62
10 Claims. (Cl. 340—146.3)

ABSTRACT OF THE DISCLOSURE

This invention provides apparatus for the automatic dimensional inspection of an object. The object is caused to move across an opening or gap behind which an energy-focusing device is located and which is arranged to collimate the energy issuing from an energy source, e.g. a light source located in front of the opening or gap. The collimated energy is used to activate a pair of appropriate transducers, e.g., photocells. A second transducer is located at the leading edge of this opening or gap, and forms a trigger device to initiate the functioning of the transducer pair, and the outputs from the transducers are fed to logical circuit means to produce a dimensional decision. This decision can be utilized to reject objects that are outside standard limits.

---

The present invention relates to apparatus for the automatic dimensional gauging of objects. In extension of this concept, the apparatus may also be used for checking the dimensions of objects with respect to a standard. This application is a continuation application of application Ser. No. 296,314, filed July 19, 1963, and entitled, "Apparatus for the Automatic Dimensional Gauging of an Object."

It has been realised that a versatile and high speed inspection and rejection system is required for the multifarious component parts which are required to make up modern products, in order to ensure that they are fit for automatic assembly. This is particularly true of parts made by plastic processes, such as glass containers, plastics containers and plastics caps which frequently exhibit residual "flash," rubber parts of uncertain dimensional precision, and so on.

The invention is based on the same principles of photoelectric combination logic which is used for optical character recognition, and it has the outstanding advantage that objects can be inspected for shape and geometrical flaws and for dimensions, whilst they are still moving through a production or handling process. On the other hand however, the invention is not necessarily limited to inspection for shape or dimensional accuracy of moving objects: it may equally well be used for stationary objects.

According to the invention, apparatus for the automatic dimensional gauging of an object comprises at least a pair of energy-transducing devices located at predetermined spaced limits representing a dimension related to the object, means for selectively irradiating and obturating said transducing devices in dependance upon the position of the object relatively to said devices, and logical means for processing information supplied thereto by said transducing devices to give an electrical output signal usable to dimensionally gauge the object with a discriminatory accuracy better than 0.01 inch.

In a preferred embodiment the energy-transducing devices comprise photoelectric devices irradiated by light sources, the object being interposed between the light sources and the photoelectric devices. Such a system makes it particularly easy to obtain suitable signals, but if desired or found more appropriate, a system employing beams of ultrasonic energy in conjunction with suitable ultrasonic transducers, or a system employing infrared radiations with appropriate detectors, could be used. In general therefore the kind of energy and the particular kind of energy-transducing devices used will be suited to the objects which it is desired to gauge. In certain circumstances some particular forms of energy will be found more suitable than others. For example, where the objects themselves are in a hot state or perhaps where it is convenient to heat them, infrared detectors could be used as the energy-transducing devices, the objects forming thin energy transmitters without the necessity of providing separate devices. The invention may also be used not only to gauge objects, particularly with respect to a standard but also for the detection of flaws or faults on a surface of objects.

It is an object of the invention to provide apparatus which is adapted to gauge objects by shape: it is a further object to provide apparatus which checks the shape and/or dimensions of objects in relation to a standard. Further objects and advantages will become apparent from the detailed specification which is to follow, taken in conjunction with the accompanying drawings which depict, largely in diagrammatic form, certain embodiments thereof by way of example, and in which:

Throughout the drawings, like reference numerals refer to like parts. None of the drawings is to scale and the various figures are not necessarily to the same scale.

In a first system of apparatus according to the invention, which is adapted for the automatic gauging of objects, there is used a plurality of light guides each of which has the property of transmitting light onto a photoelectric cell which is preferably of the photo-transistor or of the photo-diode type both of which are well-known in the art. The light guides may be of a form well established in the optical art, each consisting of a plurality of glass fibres which are suitably coated and bundled together so that light is transmitted at high efficiency from one end of the guide to the other, irrespective of whether the guide itself is in a straight line or curved or bent. The object to be recognised is located in front of a lamp with a collimating optical system if necessary, or a plurality thereof whereby light rays are caused to impinge upon the object at right angles in such a fashion that the shadow cast by the object is a replica of those features whose recognition is required. The shadow cast is picked up by an array of photocells, to which the shadow information is imparted by the light guides which are associated therewith.

The outer ends of the plurality of light guides are so arranged in a pattern related either to the object shadow or to its proximity, that a logical combination of light signals in the guides, which signals may be either of a "dark" or of a "light" nature, forms a unique logical pattern compared with other objects from which it is required to distinguish identity. The inner ends of the light guides are arranged to shine onto the sensitive part of small photocells such as phototransistors or photo-diodes and the output of these cells is taken to a combination logical electronic system. Such systems are of a type well known in the electronic art and generally consist of a network of transistors and resistors: such devices are so well known as not to need further description here: in fact they may be purchased commercially in well-known units. If necessary or found desirable, these logical circuits may be sub-divided into two distinct aspects, one of which is concerned with recognising that some object is present, for example by obscuring two of the light guides so as to indicate that a body of at least substantial length is present whilst this causes a second logical system to come into operation, the purpose of which is to distinguish in some detail the actual distinguishing features of the object now known, from the first logical system, to be present. From such logical computations the system can be arranged by conventional electronic methods to deliver a single signal to the effect that the object being tested is one of a desired class. If desired, the system can be made more sophisticated so as to use the logical arrangement of "light" and "dark" signals coming through the light guides and appropriately geometrically placed with respect to a plurality of possible shadows, to gauge or recognise a plurality of objects. These final output gauging or recognition signals can then be used as a basis for sorting objects into different categories. Such sorting devices are well known in the art and are described in many text books, amongst them the applicant's own text book entitled "Modern Automation" published in London in February 1963 by Sir Isaac Pitman & Sons Ltd. in association with Rowse Muir Publications Ltd., at page 136.

In one typical practical application of the system the objects could be arranged to be moving past the photocells and light guides, for example, on a conveyor system, whereby the gauging inspection can take place without interrupting the movement of the objects. However, the objects may be stationary if desired.

Figure 1:
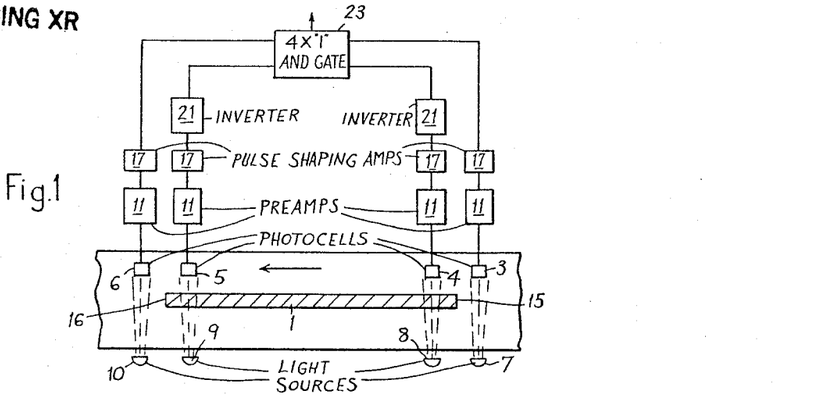
FIGURE 1 shows a plan view of a system of apparatus for gauging the dimensions of an object moving past an array of energy-transducing devices located on the apparatus.

The invention however may be used to proceed further than the mere gauging of an object, and FIGURE 1 of the drawings diagrammatically illustrates a system for gauging the actual dimensions of an object rather than the mere shape thereof. In this figure the view taken is a plan view in which 1 represents an object under test located in any desired fashion upon a movable conveyor belt illustrated at 2. In such a system it is assumed that the class of objects is known but that small variations in dimensions as for example from a manufacturing quantity production process are required to be identified. The system therefore essentially comprises an automatic inspection system.

The system of FIGURE 1 comprises a plurality of units consisting of photocell devices and light guides, schematically shown at 3, 4, 5 and 6, which are respectively illuminated by light sources 7, 8, 9 and 10, to produce electrical signals from the cells in known fashion. Whilst not essential, it may be found desirable to bring up the output signals produced by the photocell devices before the information therefrom is processed, by means of conventional preamplifiers located at 11. These preamplifiers, like all the electronic circuits used herein, are preferably transistorised. The cells 3 and 4 define a gap between them (which is exaggerated in the drawing) to indicate the limit 15 of one dimension of the object 1, and the photocells 5 and 6, similarly spaced, are used to define the opposite limit 16 of the object which in the system illustrated is the leading edge thereof. After the preamplifiers (if provided), the circuit from each cell is provided with a pulse-shaping amplifier, these amplifiers being indicated at 17.

Using the nomenclature usual in conventional logical systems, the first amplifier 17 in the direction of travel is arranged to give an output 1, the second amplifier 17 is arranged to give an output 0, the third amplifier 17 gives an output 0, and the fourth amplifier 18 gives an output 1. Inasmuch as it is desired for the signals to be combined together so as to give a resultant output which indicates whether the object is recognised or not, it will be clear that the resultant combined signal must be either 1 or 0. The signals from the second and third amplifiers 17 must therefore be inverted respectively by the inverters 21 before being passed to the 4X 1 AND gate shown at 23. Any of the well-known inverter circuits may be used as found suitable. Therefore if the object 1 comes within the dimensional desiderata set up by the positioning of the cells 3 to 6, there will be fed into the gate 23 four 1 signals, but if there is any deviation from the dimensional accuracy within the predetermined limits, one of these signals will be an 0 signal. Therefore the gate 23 will produce an output 1 if the object is of the correct, and an 0 output if the object is of an incorrect dimension.

These AND gates are conventional in the electronic art and so well known as not to require further description. They are described on page 34 of applicant's book, previously referred to, together with other examples of logical electronic equipment.

It will be appreciated that the amplifiers 17 may be arranged to give their 1 and 0 signals as light or dark pulses or vice versa. The information provided by the circuit 23 may be utilised in conventional fashion to operate selecting means to ensure that the objects passed to an accepted store or to a rejected store as the case may be. This is conventional practice, and is described on page 136 of applicant's book hereinabove referred to, and need not be further described here as it does not per se form part of the invention.

It will be appreciated that the cells 3 to 6 are associated with light guides so as to concentrate the light onto the cells but these guides have not been specifically illustrated in FIGURE 1. As it is desirable that the gaps defined between the pairs of photocells shall be as small as possible, some modification of the conventional light guide referred to hereinabove may be found desirable.

Figure 2:
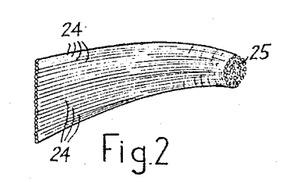
FIGURE 2 is a perspective view of one form of light guide where photoelectrical cells constitute the energy-transducing devices used in the apparatus.

FIGURE 2 shows one form of light guide which is suitable in certain circumstances and wherein the glass fibres of the bundle are splayed out at their ends into a line, the fibres 24 being arranged one above the other for this purpose to form a light-receiving area of very narrow dimensions. The other end of the bundle shown at 25 is still of substantially circular shape and is intimately associated with the light-receiving end of the photocell.

The light guide illustrated in FIGURE 2 may be about ½ inch long at the splayed-out end and about $\frac{1}{1000}$ inch in thickness and may be referred to as a "micrometric" light guide, due to the very small width at the light-receiving end.

It will be readily appreciated that by the combination of these micrometric light guides in appropriate mutual relationship, it is possible to create a photoelectric dimensional measuring system which is capable of an accuracy of the order of $\frac{1}{1000}$ inch. Such guides therefore can be typically used for the measurement of objects consisting of thin square plates, say, of one inch square, this dimension being accurately measurable to $\frac{1}{1000}$ inch by the logical system.

These light guides may be arranged along the path of the traverse of the object if it be required to inspect it in a moving condition. Two such light guides could be spaced apart by 0.999 inch between their centre lines and a second pair of such guides can be spaced apart by 1.0001 inch and so arranged as to straddle the first pair of light guides in a symmetrical fashion to give a relative separation of $\frac{1}{1000}$ inch at either end. It will thus be appreciated for example in the arrangement of FIGURE 1 that if an object has a length of 1.000 inch then as it passes across the system there will be a unique condition when both the inner light guides separated by 0.999 inch at the cells 4 and 5 will be obscured and the photocells will give no output signal whilst at the same time the two outer light guides separated by 1.0001 inch at the cells 3 and 6 will receive light which will be transmitted into the two photocells 3 and 6. Thus, by taking the output of the four cells 3, 4, 5 and 6 into the electronic combination logical system or AND gate 23 there will be a unique signal generated which will indicate this unique dimensional presence. This unique signal can thus be made the basis for the dimensional sorting of objects.

Figure 3:
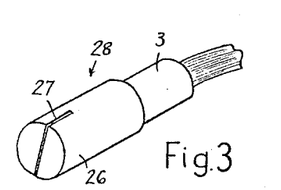
FIGURE 3 is a perspective view of a second kind of light guide for use in conjunction with a photo electric device, FIGURES 4 to 8 respectively show modified apparatus for checking the dimensions of objects.

Another form of light guide which has been found to be very suitable is illustrated in FIGURE 3. This device no longer includes a bundle of glass fibres but provides a narrow masking slit effectively to limit the exposed area of the photocell to, say, a length of 0.10 inch and to a width of say, 0.002 inch. When the photocells are to be used in close proximity for the purpose of accurate dimensional difference recognition is becomes difficult mechanically to manufacture such narrow masking slits within the total space occupied by a plurality of cells. It is highly desirable that photocells of small diameter be used and a suitable cell is that known as the Philips OAP 12 cell which has a diameter of only about 0.1 inch. This particular cell is also of such high frequency sensitivity characteristics that it can meet the general requirements of a photoelectric system when objects are moving at speeds of the order of a few feet per second. To form the device of FIGURE 3 an aluminium or copper round extrusion is manufactured having a very thin wall of the order of 0.005 inch thick, one end of the extrusion being blanked off and the other end open. These extrusions are similar to but smaller than those used for canning transistors. The blank end 26 of the extrusion is provided with a narrow saw cut and into this saw cut a piece of feeler gauge material of the required slit width is inserted. The blank end of the extrusion is then pinched until the width of the cut is restricted to that of the trapped feeler gauge When the feeler gauge is subsequently extracted it leaves a masking slit 27 of the desired dimensions. By this means narrow slits can be manufactured to great accuracy and the slit sides are very clean. Slits have been made in this way having widths over the range 0.030 inch to 0.001 inch with lengths of the order of 0.1 inch and the method of manufacturing these masks has been found very economical. The cap generally indicated at 28 is slid over the photocell, indicated for example at 3 in FIGURE 3, to provide a unit comprising a cell and an inbuilt masking slit therefor. It will be apparent that such a unit only adds a few thousandths of an inch to the diameter of the photocell, whereby a plurality of such cells with their masks can be mounted very closely together and they may be fixed in suitable relative register, simply by drilling a mounting plate to provide holes of such size as to take the cell housing as a push fit. If desired, the units can be cemented in addition. Such a housing is described later in connection with FIGURE 11. In order to keep dust from entering and obscuring the slits they can be covered by a transparent sheet material such as glass or plastics.

It has been found particularly effective, directly to cement the end of the light guide to the most sensitive portion of the photocell. The most sensitive portion of the small photo-diodes or photo-transistors preferred, is at the outer surface thereof. This secures maximum electrical output response from the light in the light guide, and this cementing operation can be effectively carried out by using a suitable transparent cement which may have a base of a transparent plastics material, such as polystyrene, cellulose acetate, or polyester. Alternatively, the cement may be in the form of an appropriate waterglass (sodium silicate).

Furthermore, it has been found that it facilitates the cementing and relationship of the light guide to the most sensitive part of the cell, to remove the extreme top and usually unwanted reflecting surface of the diode or phototransistor by means of a diamond wheel or other cutting tool.

When used with Philips OAP 12 photocell, the resolution accuracy of the cell and mask unit is considerably greater than that of the nominal slit width provided that the system operates into pulse-shaping electronic trigger amplifiers of the kind well established in the electronic art and which have been described above in conjunction with FIGURE 1 at 17. A typical commercial example of these pulse-shaping amplifiers is known as the Philips PS 1 pulse-shaping module.

The reason for this unexpected result is that the accuracy of the dimensional shadow position to create a signal cut off in a combination consisting of a photocell and a pulse-shaping amplifier is often better than $\frac{1}{10000}$ inch but that due to the temperature drift in the cell and associated electronic circuits, this accuracy cannot be repeated over a substantial duration of time of, say one hour. Thus the effectiveness of the superimposed masking slit is to limit the drift characteristics of the combined cell and pulse-shaping amplifier, due to a relationship with the limited total amount of light permitted to enter the cell by the restricting slit width. In practice it has been found that this combined and complex effect stabilises the ultimate accuracy of dimensional discrimination to an order of ¼ that of the slit width so that if masking slits of 0.004 inch are employed then the practical and repeatable accuracy of the system discrimination is about 0.001 inch.

In order to increase the accuracy of the system illustrated in FIGURE 1 it has been found to be an improvement to isolate a single photocell, which can be designated a "trigger" cell, and the sole purpose of which is to be activated by a falling shadow (or leaving a shadow as an alternative) associated with the leading edge (in the former case) of the object under inspection so that the electronic amplifier used as a pulse shaping device associated with this trigger photocell gives out a signal when the cell is obscured.

Figure 4:
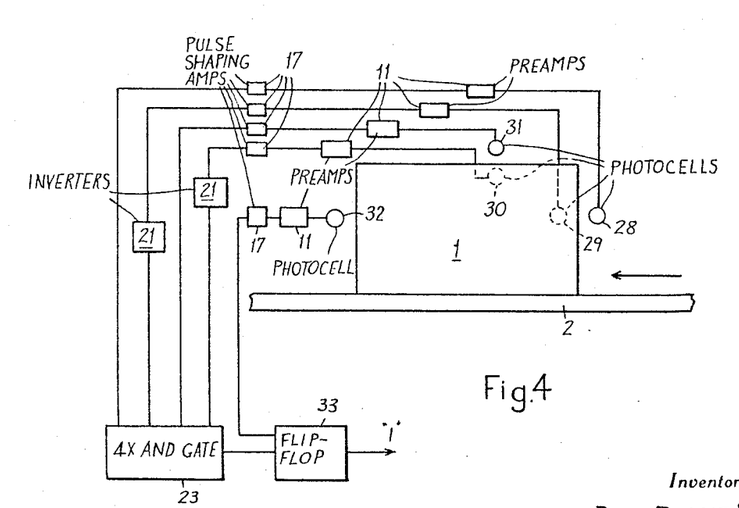

Such an arrangement is illustrated in FIGURE 4 but in this case the view is elevational and the photocells located behind the object 1 are shown in dotted lines. The co-operating light sources are not shown, but their position can be inferred from the arrangement of FIGURE 1. These photocells are shown at 28 and 29 for the trailing edge 30, and 31 for the upper edge, and 32 represents the trigger cell. The output from each cell may again be passed through preamplifiers 11, inverters 21 are provided as in the arrangement of FIGURE 1, the outputs from the four cells 28 to 31 terminating in the 4X 1 AND gate 23 to operate in the manner previously described.

The output from the trigger cell 32, after preamplification at 11 if necessary, is then caused to activate and fix the state of a logical electronic flip-flop circuit schematically illustrated at 33, at the input of which is connected the output from the AND gate 23. Another purpose of the flip-flop circuit 33 is to ensure that the output mechanical gates for the automatic classification of the objects stay in their last registered position until a fresh object is measured. The flip-flop circuit 33 may conveniently comprise a Philips FF 2 unit which is commercially available, and the condition of the fixed state is determined by a logical consequence of a pattern of measuring cells associated with the dimensional tolerances on the other shadow peripheries of the object with which the pairs of cells 28, 29 and 30, 31 are respectively associated. The system in FIGURE 4 is thus usable for the dimensional inspection of the rectangular object 1, for both correct height and width as defined by the pairs of cells 28, 29 and 30, 31 in association with the trigger cell 32 on the leading edge. Thus the location of cell 30 defines the undersize tolerance for height, the cell 31 defines the oversize tolerance for height, the cell 29 defines the undersize tolerance for length, and the cell 28 defines the oversize tolerance for length.

Thus, at the moment when the trigger cell 32 operates and fixes the flip-flop circuit 33, the state of the combination of states on the cells 28 to 31 will determine the output decision of the flip-flop 33, this decision being utilised as a control in the manner previously referred to.

When the object is correct for size, the shadow thrown by the object will cause cells 31 and 28 to be in the illuminated state and the cells 30 and 29 to be darkened. Thus, if such conditions subsist and by inverting the sign of the output from the cells 29 and 30 by the inverter amplifiers 21 and combining the outputs from the two cells 28 and 31 with the inverter outputs from cells 29 and 30 in the electronic AND gate 23, then the gate will be totally activated to positive output and the flip-flop will be accordingly decided as to state on reception of the signal from the trigger photocell 32. As before, it will be understood that all the photocells require the addition of suitable pulse-shaping amplifiers, and these are again illustrated at 17.

By the use of different combinations of signals in such a system, decisions can also be secured as to various forms of rejection.

The signal-processing herein referred to does not, per se, form part of the invention, being well-understood in the art to which the invention relates. Further description of appropriate processing circuits may be obtained from many well-known text books such as the applicants own book "Modern Automation" referred to above.

In the application of the invention to the dimensional inspection of transparent or semi-transparent articles, such as glass bottles, it will be appreciated that such articles could give rise to spurious and erroneous decisions due to the light which is transmitted through parts of the object under inspection creating a light signal instead of a dark signal presumed when the object is casting a shadow.

In particular, when the system as described above is employed in which a dark-going state of the trigger photocell 32 created by the leading edge of the shadow of the object under inspection is used to create a "read now" signal to know the state of the cells on other peripheries of the object, the same trigger cell 32 can go light and then dark again due to transmitted light through the transparent object and thus create a second and unwanted recognition of the object, which in these circumstances would possibly lead to a system decision of "too small" since the measuring cells are likely to be illuminated behind the trailing edge of the object under measurement. Thus it becomes highly desirable to prevent such erroneous second and even subsequent signals being generated from the trigger cell, and this prevention can be accomplished by any one of four means or by their combination. These means are illustrated in FIGURES 5, 6, 7 and 8, in which the object to be measured is illustrated as taking the form of a glass bottle.

Figure 5:
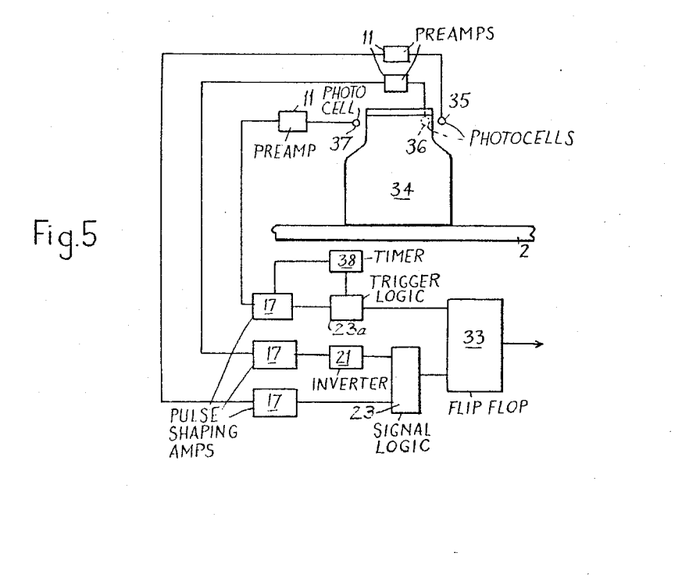

In FIGURE 5, the object 34 travelling on the conveyor 2 is sensed by three photocells, viz., 35 representing over-dimension, 36 representing under-dimensional in conjunction with the trigger cell 37 at the leading edge of the object.

As before, these cells are energised by suitable light sources with appropriate collimating optics, where found necessary, but since all of FIGURES 5 to 8 are elevational representations, the light sources and collimating means are not illustrated. Their positions can however be easily inferred from what has gone before.

The output from each of the cells 35 to 37 in FIGURE 5 may again be taken through preamplifiers 11 and to pulse-shaping amplifiers 17 and the initial and correct "dark-going" state of the leading shadow edge trigger cell 37 is used to start a conventional timing device 38 such as an electronic delay circuit whose duration time is just a little exceeding that of the time of transit of the object 34 and which is used appropriately to inhibit the trigger cell 37 from creating a second or subsequent "read now" signal to the measuring cells 35 and 36. For example, the timing device 38 may be arranged in its sensitized phase to give out an 0 signal which can be combined with the amplified output of the trigger cell in an AND gate 23a so that the trigger cell is inhibited at the output of the AND gate 23a from instructing output flip-flop 33 to change its decision. The output from the pulse-shaping amplifier connected to the cell 36 is passed through an inverter 21 in the manner illustrated in conjunction with FIGURES 1 and 4 and the output from the AND gate 23a and from the AND gate 23 are combined together in the output flip-flop circuit 33 in a fashion similar to that described in connection with FIGURE 4, to produce an output decision signal for subsequent use.

Figure 6:
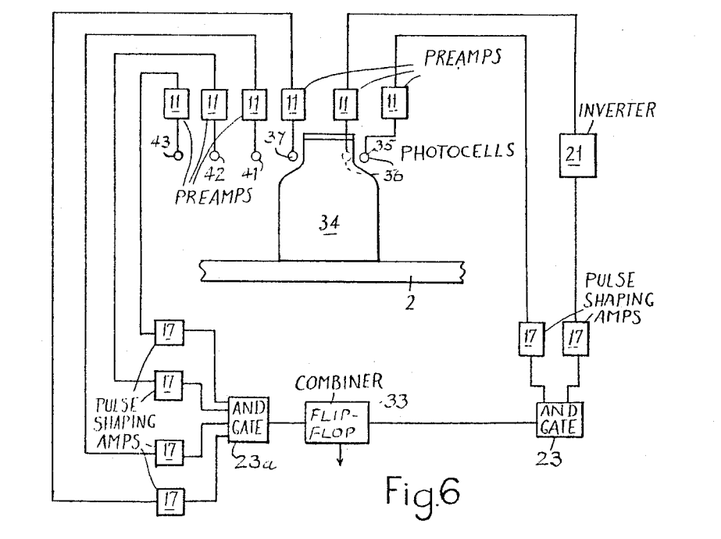

In a second method, use is made of the fact that the light transmitted through a nominally transparent object under inspection contains zones of transmitted light, some of which are, and others of which are not, of sufficient luminosity to activate a photocell as used in this system. In practice, it has been found that objects such as bottles only transmit an adequate amount of light to activate the photocells of such a system across the middle third of the bottle. A system for carrying out this second method is illustrated in FIGURE 6 where the bottle 34 travelling on the conveyor 2, passes by not only the array of photocells 35, 36 and 37, with their appropriate preamplifiers 11 and pulse-shaping amplifiers 17, the cell 36 also being provided with an inverter 21 as previously described, but in addition, a number of further photocells 41, 42, 43, which can be referred to as "guard cells" are added to the system and are placed in such a probability array that there is little likelihood of all the cells at any one time being activated into the light state. The outputs of such cells and of the trigger cell 37 are fed into a common AND gate 23a after pulse-shaping in amplifiers 17 and the outputs from the cells 35 and 36 after similar pulse-shaping, are taken to the conventional AND gate 23. The outputs of the gates 23 and 23a are fed into a flip-flop output circuit 33, to produce a decision output as previously described. With such an arrangement there is a high probability that the trigger cell 37 will be inhibited under action due to transmitted light, provided that at least one of the guard cells 41 to 43 is in the "dark" state.

Figure 7:
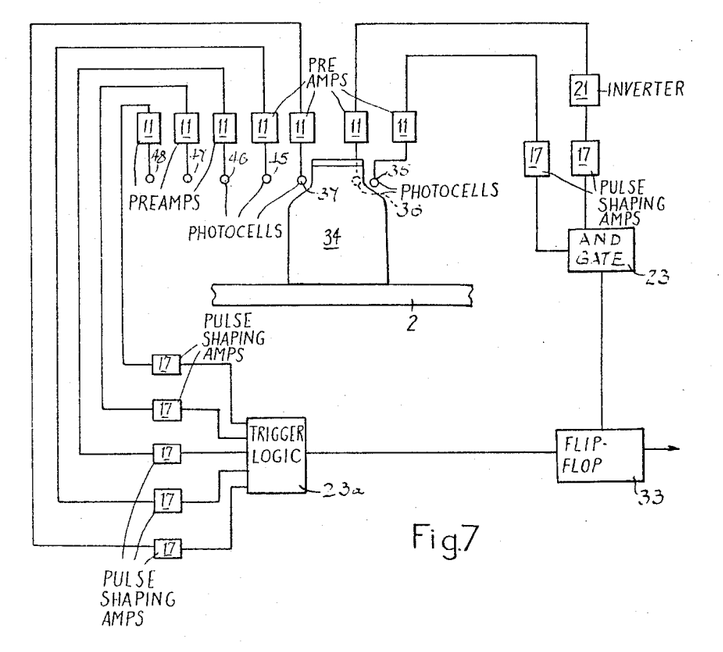

In a third method, use is made of the fact that the amount of light transmitted through the thickness of an object such as a glass bottle, in the area of the leading and trailing edges of the cast shadow, is very much less than that transmitted through the walls of the bottle when the pulses are substantially at right angles to the direction of the light transmission. Thus by the provision of one or more guard cells located along the axis of motion of the bottle, and at such spacing less than the continuous dark zone extension, and so that such guard cells are darkened successively, following in the path of the trigger cell, and by the combination of all the outputs from the guard cells and from the trigger cell in an AND combination logical gate, the trigger cell is inhibited from second and subsequent operation by the fact that any one of such following up guard cells is in the dark condition. Such a system is shown in FIGURE 7, where the additional guard cells are shown at 45, 46, 47 and 48, the outputs from the AND gates 23 and 23a being combined together in a flip-flop circuit or combiner 33 to produce a control decision. The AND gate 23a is similar to the AND gate 23 in all embodiments.

Figure 8:
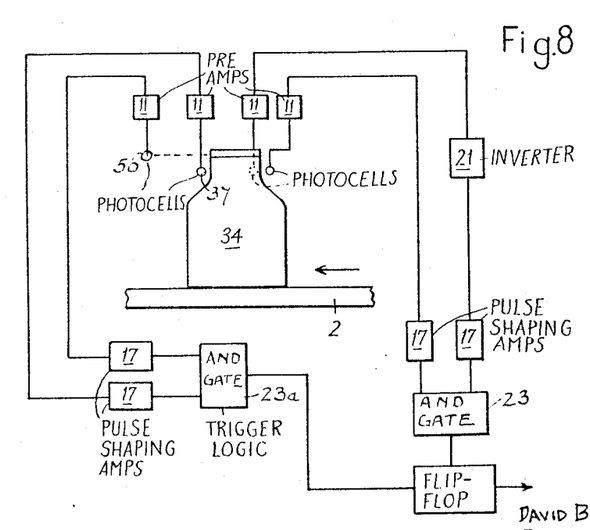

In a fourth method, use is made of the fact that there is normally an area on the transparent object where the cast shadow in the direction of transit persists at a level of low transmitted luminosity and which can be used for guard cell protection against any spurious triggering of the trigger cell. Normally, in objects such as glass bottles this zone of persistant low transmitted luminosity is associated with peripheries of the object, having marked curvature, such as the extreme top and the base. This is partly due to the fact that such zones contain a greater transmitted path through the medium of the object and this particularly refers to the solid bases of objects such as bottles, but even more it is found to be associated with the rounded external curves of such extremities, these curves tending to reflect and refract the incident light away from the direct transmission direction. The effect can be observed in practice by holding a translucent or transparent object such as a glass bottle against a bright light, when it will be found that the sides, rounded and open tops and the bases of such objects are relatively darkened. A system for carrying out this fourth method is shown in FIGURE 8, the technique consisting of locating one or more guard cells 50 so as to catch the shadow of such areas or zones a short time after the trigger cell 37 has first operated on the dark-going signal, and thus to combine in a logical AND gate 23a the output of the trigger cell 37 and the output of such guard cell or cells 50, in order to inhibit the output of the trigger cell to subsequent logical decision whilst the object is in transit, the outputs from the logical AND gates 23 and 23a being combined by the flip-flop circuit 33 to produce an output decision as in previous cases.

Figure 9:
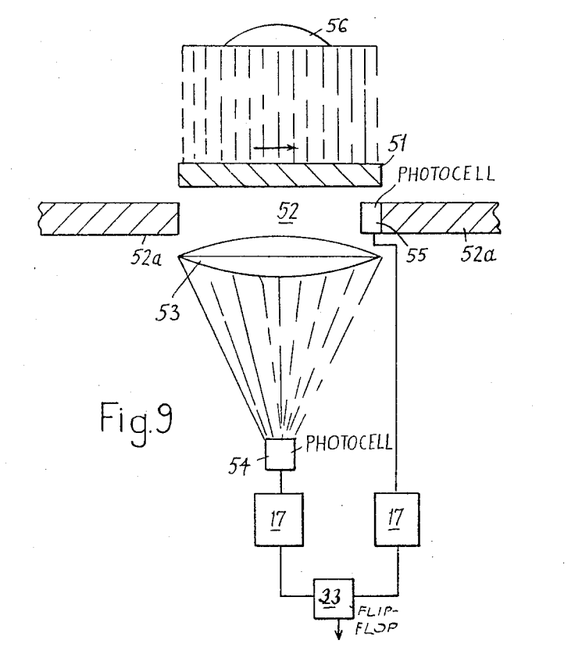
FIGURE 9 shows an arrangement for detecting deviation of an object from a standard profile.

In the industry of manufacturing objects by quantity production methods, and particularly as related to a prerequisite for the automatic assembly of piece parts, it is highly desirable to check that an item is correct as regards the main features of its geometry or shape and even as to the dimensional accuracy of such shape. For such purposes the invention provides a system embodying several features of the foregoing description but involving a further principle which consists essentially in the same general sort of shadow measurement using photocells as hereinbefore described, but differing in that the signal cell or cells are concerned in picking up the deviation of a total profile from the required theoretical profile. FIGURE 9 shows an example of such a system where the object is a disc 51 where it may be required to check that the periphery is of correct size and shape. To accomplish this. the disc is allowed to slide sufficiently over an opening 52 in a plate 52a, the geometry of said opening consisting of an area of disposition exactly the same as the shadow which would be cast by the disc 51. The area of the opening 52 being also the field of a lens 53 focusing on to a single photo cell 54. If desired, however, more than one photocell may be used in this position. At the edge of the opening which corresponds to the leading edge of the shadow thrown by the disc is located a trigger photocell 55 whose purpose is to request the signal photocell 54, as to whether there is an escape of light as between the object and its corresponding masking opening, and if such an escape of light exists it indicates the deviation of shape as between the object under scrutiny and its theoretically correct shadow of the mask opening geometry. Again, the outputs from the cells 54 and 55 are passed through the pulse shapers 17 and an output flip-flop 33, to give a final decision. It will be appreciated that this figure is abbreviated and that preamplifiers 11 may be provided as in other arrangements. An irradiating light source for the cells is shown at 56.

Such a system is only suitable for checking that an object is correct as to concentricity and shape of included openings and as to not being undersize at parts of its external periphery. For objects which may be oversized a corresponding system can be designed and consisting of a masked opening behind the object which corresponds to oversized aspects of the object geometry, the reduction of light into which is caused by oversize interference by the geometry of the interplaced object will be detected by a lens focussing on to a photocell, the timing of the register between the object and the oversize detection opening being triggered by a photocell suitably located to act as a leading edge shadow trigger.

In all the applications so far referred to it has been assumed that the object being inspected causes a direct shadow to fall on a system or array of units comprising photocells and light guides, with or without the interposition of collimating lenses, and so far as FIGURES 4 to 9 are concerned, the array includes a trigger cell at the leading shadow edge to establish the "read now" signal to the measuring cells. The same general form of system can however also be applied when the shadow or profile of the object has been magnified by means of a lens system to fall on a plane on which is located an equivalent set of photocells, and this magnified shadow graph dimensional and shape recognition technique is particularly applicable either to very small objects as related to the dimensions of the photocells and their masking light guides or slits, or when it is required to measure to a greater accuracy than the direct shadow system would yield. Thus it has been found that where a system of direct shadows has a resolution of, say, $\frac{1}{1000}$ inch, after this is converted to an optically magnified image of 10 times and using the same cell and slit units, the resolution is increased to $\frac{1}{10000}$ inch.

In the foregoing description it has been assumed throughout that the trigger photocell yielding the "read now" signal is associated with the leading edge of the object shadow and is produced by a fall in light from light to dark. However, it will be apparent to those skilled in the art that such a system can be reversed so that the trigger cell is associated with the trailing edge of the shadow going from dark to light and this with the measuring cells associated with the leading edge of the shadow. Electronic techniques for delivering a signal associated with trigger cells on a change of light-dark or dark-light but not both in the same system, are well established in the art, the former being exemplified by the modular unit referred to hereinabove and known as the Philips FF 2 combi-element system, applying the trigger signal to the "AC Shift Input" terminal thereof.

Moreover, it is desired to point out that whilst the above systems refer to dimensional inspection in general, it will be apparent that the expressions "gauging od dimension" and "gauging of shape" are generally interchangeable, the former being a limiting condition of the latter.

All systems can give detection signals to mechanical segregating gates.

During manufacturing processes it sometimes happens that manufactured objects are produced with burrs which consist of undesirable projections standing proud from the main plane of the object and caused by the cutting tools of the process. One of the problems of inspecting for such burrs is that it is normally necessary mechanically to scan the object around its periphery, for example, around the outer periphery of a washer, so as to detect the presence of a burr which may in fact exist only on part of the periphery.

Figure 10:
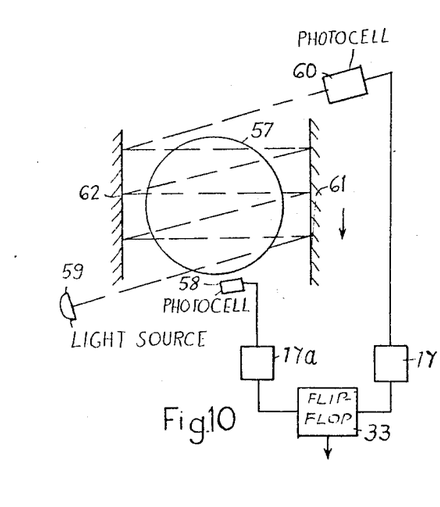
FIGURE 10 shows apparatus for detecting the presence of flaws on the surface of an object.

The apparatus according to the invention can be modified to detect burrs, irrespective of position on a periphery, by a system which is schematically illustrated in FIGURE 10 which shows a plan view of the arrangement, and in which an object 57 is caused to move in a direction represented by the arrow. A trigger photocell 58 is operated by the leading edge of a shadow thrown by the object 57 and a light 59 and second photocell system 60, are so arranged that a defined pencil of light indicated by the dotted lines traverses, the object 57 across the path of possible burrs. The light passes between a system of mirrors 61, 62 which are parallel to each other on either side of the object 57. Thus the pencil of light is reflected back and forth across the object 57 in zig-zag fashion so that it is interfered with by any burr on the periphery, the pencil of light finally falling onto the photocell 60. Thus all possible locations for burrs are explored by the light pencil in series, although of course at the speed of light, and any interference by a burr or other unrequired projection comprises an obstruction in the zig-zag pencil of light and a corresponding change in the photocell response. The photocell 60 is associated with electronic circuits which can be set to trigger at the magnitude of undesirability. Thus the trigger cell 58 is connected via a pulse-shaping amplifier 17a and the signal cell 60 via a pulse-shaping amplifier to a flip-flop circuit 49 to give an output decision signal as in a previous arrangement.

Figure 11:
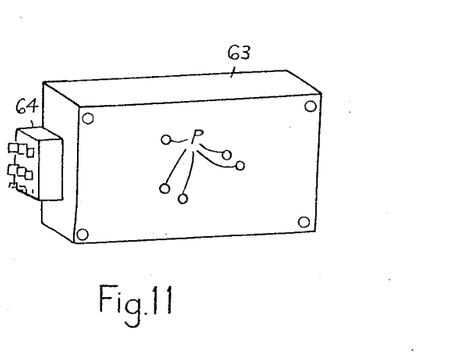
FIGURE 11 shows an example of an array of energy-transducing devices, specifically photoelectric devices, mounted as a plug-in replaceable unit.

Reference has been made throughout this specification to an array of photocells, and a convenient unit for mounting such an array is shown in FIGURE 11, comprising a casing 63 in which a plurality of photocells indicated at P are arranged in a pattern on one mounting face of the casing. The casing contains the necessary leads and connections and terminates in a plug unit such as a plug 64, whereby the box may be plugged into an appropriate socket connected with the other required electronic apparatus. Thus a plurality of units 63 may be provided with different arrays of photocells so that different dimensional standards can be catered for with the appropriate unit 63 plugged into position. Thus for example ranges of objects of different sizes may be shape-or dimension-checked in a most convenient fashion.

Reference has been made throughout this specification to certain electronic devices or circuits as being well-known in the art to which the invention relates. Whilst this statement is of course true, it will be appreciated that various modifications may be made to these conventional units: such modification is also quite usual in the electronic art. Generally, circuits are published and units made commercially available on the understanding throughout the art that they are, in general, basic, and subject to adaptation and modification to suit user requirements. Such modifications usually take the form of variation of the values of the various resistors, capacitors, inductors and other basic components, so as to suit the users' needs, for example for obtaining steeper or shallower waveforms, for giving different degrees of amplification, faster or slower decay times, or different time constants. Nevertheless, such modifications as are made still do not alter the basic design principles only the immediate operational requirements. With these reservations in mind, the various items of electronic apparatus utilised in the arrangements of the present invention are tabulated below for ease of reference, with their sources of origin. It will also be appreciated that these sources are in any case given only by way of example of the units which may be utilised to put the invention into effect. Where appropriate commercial units are not available, literature references are given.

| | Philips |
|---|---|
| Photo-cells | OAP 12 |
| Inverters 11 | 21 A1 |
| Pulse shaping circuits 17 | PS 1 |
| AND gates 23 | 23 A1 |
| Flip-flop circuits 33 | FF 2 |

It will also be pointed out that the pulse-shaping amplifiers 17 may be replaced by conventional linear amplifiers combined with electronic signal level detectors.

It will also be appreciated that there is no limit to the number of measuring cells provided for the purpose either of (a) the simultaneous measurement of the dimensions of different parts of the same object, e.g., height and width, or (b) the grading of a particular nominal dimension of an object into several size classifications. In the latter case it will be necessary to increase the number of logical combination logic systems and the number of output decision flip-flops.

What is claimed is:

1. Apparatus for the automatic dimensional gauging of an object comprising a plane support for supporting said object and directing its advancement in a predetermined direction, a plurality of pairs of energy-transducing devices arranged in a pattern, each pair defining certain acceptable limits for one dimension, and said pattern defining a plurality of object dimensions, means for irradiating said transducing devices so positioned that said transducing devices are successively irradiated and obturated in dependence upon the position of the object relative to said devices, logical means connected to receive and process information supplied thereto by said transducing devices, an additional energy-transducing device isolated from said logical means and positioned to be activated by the passage of the leading edge of the moving object to give a trigger output signal, and an electronic flip-flop circuit, the input of which is connected to the output of said logical means, said flip-flop circuit being connected to be activated and have its state fixed by said trigger output signal, and emit when activated a signal indicative of whether said plurality of object dimensions fall within said acceptable limits.

2. Apparatus as claimed in claim 1, wherein the number of energy-transducing devices is $N+2$, where N is the number of dimensions under inspection.

3. Apparatus as claimed in claim 1, for use in a system in which the object to be gauged is transparent, wherein extra energy-transducing devices, used as guard devices, are positioned beyond the leading edge of a moving object in such a manner that all said guard devices cannot be positively actuated simultaneously, the common output of said guard cells being fed into a second logical means in combination with the first, the outputs from both said logical means being fed into a combining circuit.

4. Apparatus as claimed in claim 1, for use in a system in which the object to be gauged is transparent, wherein extra energy-transducing devices, used as guard devices, are positioned beyond the leading edge of a moving object in such a manner that all said guard devices cannot be positively activated simultaneously, the common output of said guard devices being fed into a second logical means in combination with the first, the outputs of both said logical means being fed into an electronic flip-flop circuit.

5. Apparatus as claimed in claim 1, for checking deviation of an object from a total profile, wherein the object is caused to slide over an opening behind which an energy-focusing device collimates the energy from an energy source constituting said irradiating means and located in front of the opening, said collimated energy being used to activate an energy-transducing device, and wherein a second energy-transducing device is located at the leading edge of said opening, the outputs from said devices being fed to said logical means to produce a dimensional decision.

6. Apparatus as claimed in claim 1, for use in a system in which the object to be gauged is transparent, said apparatus comprising a timing device, the output from said isolated device being connected to start said timer device which is connected to inhibit said isolated energy-transducing device from supplying a second output signal to said flip-flop circuit.

7. Apparatus as claimed in claim 1 in which the number of energy-transducing devices is $1+2N$, where N is the number of dimensions gauged.

8. Apparatus as claimed in claim 1, wherein the energy-transducing devices are photocell devices energized by light beams.

9. Apparatus as claimed in claim 8 in which said photocell devices are photo-transistors.

10. Apparatus as claimed in claim 8, wherein the photocell devices are photo-diodes.

(References on following page)

References Cited

UNITED STATES PATENTS

| | | | |
|---|---|---|---|
| 2,941,086 | 6/1960 | Gottschall et al. | 250—219 |
| 2,978,943 | 4/1961 | Balint | 250—219 |
| 3,025,406 | 3/1962 | Stewart et al. | 250—222 |
| 3,061,732 | 10/1962 | Milnes | 250—219 |
| 3,066,226 | 11/1962 | Lindstrom | 250—219 |
| 3,092,809 | 6/1963 | Merritt et al. | 340—146.3 |
| 3,094,623 | 6/1963 | Weiss | 250—219 |
| 3,104,324 | 6/1963 | Rabinow | 340—146.3 |
| 3,104,370 | 9/1963 | Rabinow | 340—146.3 |
| 3,164,806 | 1/1965 | Rabinow | 340—146.3 |
| 3,171,621 | 3/1965 | Steinbach et al. | 250—222 |
| 3,180,995 | 4/1965 | Briggs et al. | 250—222 |

MAYNARD R. WILBUR, *Primary Examiner.*

M. L. LEVY, *Examiner.*

J. E. SMITH, J. SCHNEIDER, *Assistant Examiners.*